J. ECKHARD.
AUXILIARY SPRING FOR VEHICLES.
APPLICATION FILED FEB. 4, 1910.
962,703.
Patented June 28, 1910.
2 SHEETS—SHEET 1.
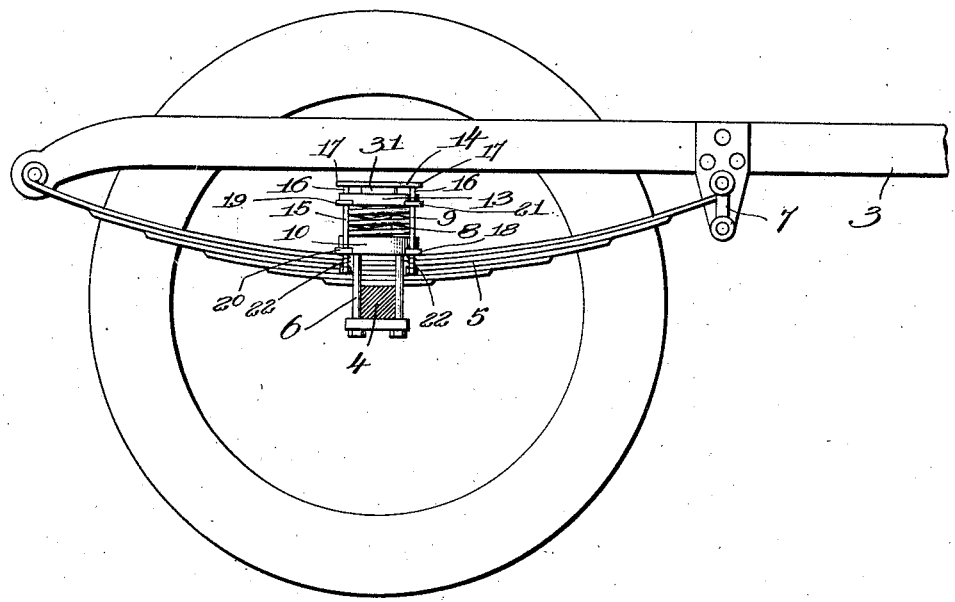
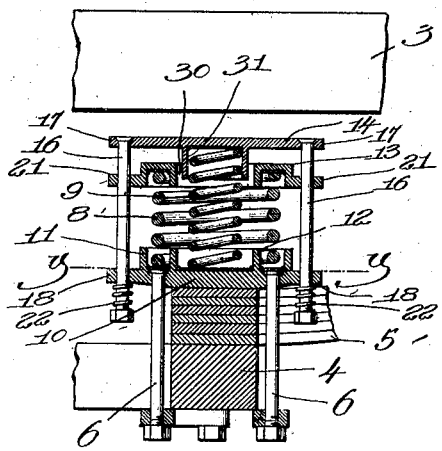
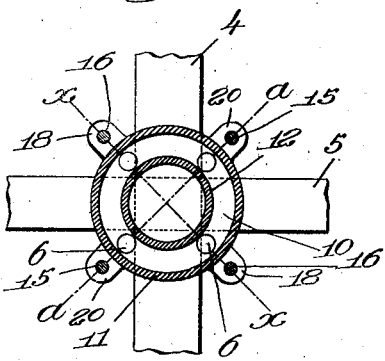

J. ECKHARD.
AUXILIARY SPRING FOR VEHICLES.
APPLICATION FILED FEB. 4, 1910.
962,703.
Patented June 28, 1910.
2 SHEETS—SHEET 2.
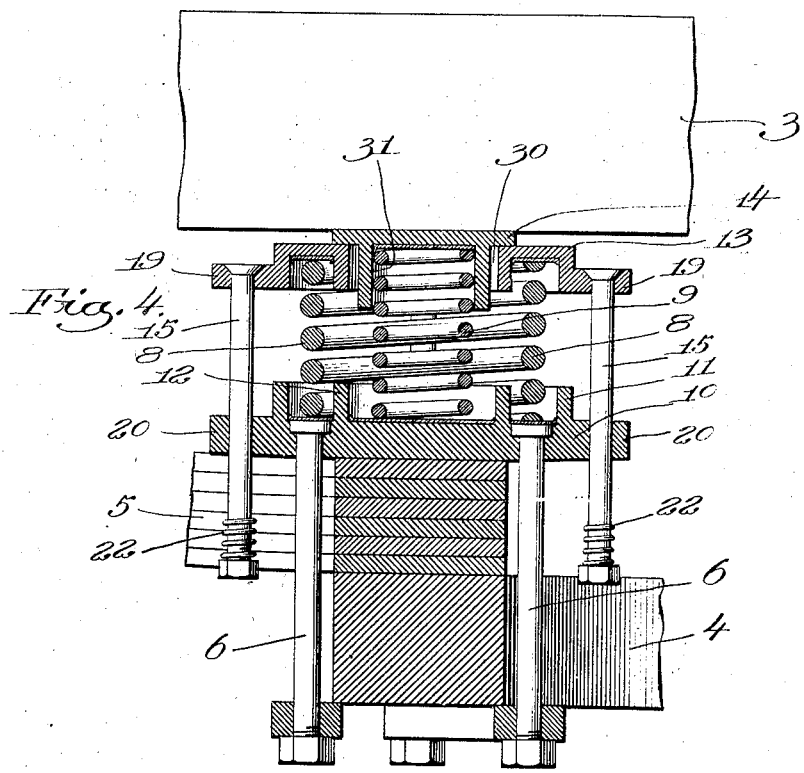
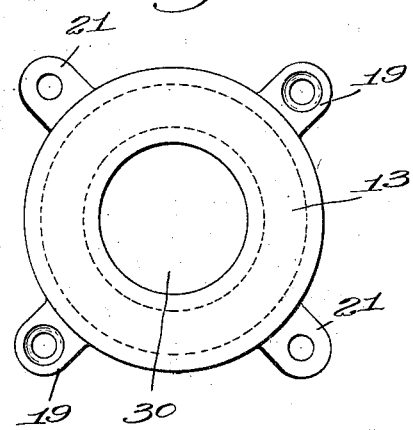
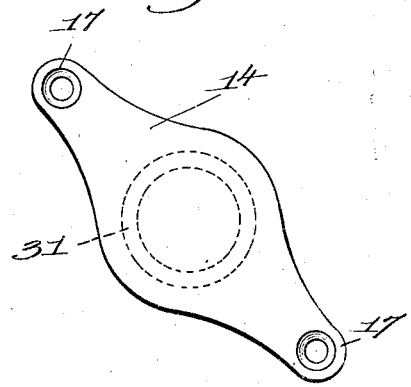
Witnesses:
Fred. S. Greenhalgh
Joseph M. Ward
Inventor.
John Eckhard,
by Crosby & Gregory
Attys

UNITED STATES PATENT OFFICE.

JOHN ECKHARD, OF BOSTON, MASSACHUSETTS.

AUXILIARY SPRING FOR VEHICLES.

962,703.  Specification of Letters Patent.  Patented June 28, 1910.

Application filed February 4, 1910. Serial No. 542,115.

*To all whom it may concern:*

Be it known that I, JOHN ECKHARD, a citizen of the United States, residing at Boston, county of Suffolk, and State of Massachusetts, have invented an Improvement in Auxiliary Springs for Vehicles, of which the following description, in connection with the accompanying drawing, is a specification, like characters on the drawing representing like parts.

This invention relates to springs for automobiles and other vehicles and particularly to springs for motor trucks and other motor vehicles designed to carry heavy loads. It is a well-established fact that when the springs of a vehicle of this nature are of sufficient strength and capacity to properly sustain the loaded vehicle, such springs are practically unyielding when the vehicle is unloaded.

My invention has for its object to provide a novel spring construction which involves a main spring adapted to yieldingly sustain the vehicle body when it is unloaded, and an auxiliary spring arrangement adapted to be brought into play when the body is loaded to coöperate with the main spring for yieldingly supporting the load.

The features wherein my invention reside will first be described, and then pointed out in the appended claims.

Referring to the drawings, Figure 1 is a side view of one end of a truck frame showing a spring device embodying my invention; Fig. 2 is a vertical section through the spring on substantially the line $x$—$x$, Fig. 3; Fig. 3 is a horizontal section on the line $y$—$y$, Fig. 2; Fig. 4 is an enlarged section on the line $a$—$a$, Fig. 3; Fig. 5 is a top plan view of one of the spring caps; Fig. 6 is a top plan view of the other spring cap.

In the drawings, 3 designates one of the side sills of an automobile frame and 4 the axle which may be either the front or the rear axle. This axle supports a main spring 5 which is preferably a leaf spring of usual construction and which is secured centrally to the axle by suitable clips 6, and at its ends is connected to the side sill 3 of the frame in usual manner. This main spring 5 is made of such a strength and resiliency that it will yieldingly support the vehicle body when the truck is empty. When made in this way it has not sufficient strength to support the loaded truck properly, especially when the latter is loaded with several tons weight as motor trucks often are. To provide for properly supporting the weighted vehicle body, I provide an auxiliary spring device which comprises two coil springs 8 and 9 that are situated to be brought into play to assist in supporting the body when the spring 5 is flexed beyond a predetermined point. I propose to use one of these auxiliary spring mechanisms at each end of each axle and under each end of each of the side sills 3 of the frame, although the number of these frames may be varied without departing from the invention. In the embodiment herein shown there is one auxiliary spring device for each of the main springs 5. The two auxiliary springs 8 and 9 of each device are supported in a spring support 10 which is herein shown as a base plate that rests on the main spring 5 and may be secured thereto in any suitable way, as, for instance, by the bolts of the clips 6. The two springs 8 and 9 are of different strengths, the spring 8 being stronger and less resilient than the spring 9. The base plate 10 is shown as having the outer annular flange 11 which surrounds the lower end of the spring 8 and holds it in position, and another annular flange 12 which forms a cup within which the spring 9 is received. A cap 13 rests on top of spring 8 and another cap 14 rests on top of the spring 9. The cap 13 is shown as provided with the central aperture 30 through which the spring 9 extends, and the cap 14 is provided with the annular flange 31 that forms a recess within which the upper end of the spring 9 is received and that is adapted to enter the aperture 30.

Means are provided for limiting the expansive movement of each of the springs so that under normal conditions the side sills 3 of the vehicle will be supported only by the main springs 5. One convenient way of accomplishing this is by means of tie-rods 15 and 16 that tie the caps 13 and 14 to the base plate or support 10. As herein shown, the cap 14 is provided with two ears 17 to which the tie-rods 16 are secured, said tie-rods passing down through two ears 18 formed on the base 10. The cap 13 is also provided with two ears 19 to which the tie-rods 15 are secured, said tie-rods passing down through ears 20 on the base plate 10. The cap 13 is also preferably provided with other ears 21 situated so that the tie-rods 16 will pass down therethrough. It will thus be seen that these tie-rods 15 and 16 serve to hold the caps in place and also limit the expansive movement of the springs. The tie-rods 15 are sufficiently shorter than the tie-rods 16 so that under normal conditions the cap 14 will be somewhat above the cap 13, as seen plainly in Figs. 1 and 2. If desired, I may place springs 22 on the tie-rods below the base so as to prevent any rattle of the parts when the vehicle is unloaded.

Under normal conditions when the vehicle is unloaded, the springs are in the position shown in Figs. 1 and 2 and the main springs 5 are of proper strength to yieldingly and resiliently support the vehicle body. When the body is partially loaded, the spring 5 will flex sufficiently to permit the body to come down onto the cap 14, and the spring 9 will then be brought into play to assist the spring 5 in supporting the load. When the truck is fully loaded, the spring 9 is compressed sufficiently to bring the cap 14 down into contact with the cap 13, as shown in Fig. 4, and thereafter both of the auxiliary springs 8 and 9 act together to assist in resiliently supporting the load.

Various changes in the construction of the parts may be made without departing from the invention.

Having fully described my invention, what I claim as new and desire to secure by Letters Patent is:—

1. In a vehicle, the combination with an axle, of a vehicle body, a main spring supported by the axle and sustaining the body, an auxiliary spring device comprising a spring holder carried by the axle, two coil springs carried by said holder, one of greater strength than the other, a cap for each spring, and tie-rods secured to each cap and passing loosely through the holder one of said caps having ears thereon through which the tie-rods of the other cap pass.

2. In a vehicle, the combination with an axle, of a vehicle body, a main spring supported by the axle and sustaining the body, an auxiliary spring device comprising a spring holder carried by the axle, two coil springs carried by said holder, one of greater strength than the other, a cap for each spring, and tie-rods secured to each cap and passing loosely through the holder, the tie-rods secured to the cap for the spring of greater strength being of less length than the other tie-rods.

3. In a vehicle, the combination with an axle, of a vehicle body, a main spring supported by the axle and sustaining the body, an auxiliary spring device comprising a spring holder carried by the axle, two coil springs carried by said holder, one of greater strength than the other, a cap for each spring, tie-rods secured to each cap and passing loosely through the holder, one of said caps having ears thereon through which the tie-rods of the other cap pass, and a spring engaging each tie-rod and serving to yieldingly hold the caps against the coil springs.

In testimony whereof, I have signed my name to this specification, in the presence of two subscribing witnesses.

JOHN ECKHARD.

Witnesses:
  LOUIS C. SMITH,
  THOMAS J. DRUMMOND.